US009895768B2

(12) United States Patent
Kuki et al.

(10) Patent No.: US 9,895,768 B2
(45) Date of Patent: Feb. 20, 2018

(54) LASER PROCESSING APPARATUS

(71) Applicant: DISCO CORPORATION, Tokyo (JP)

(72) Inventors: Junichi Kuki, Tokyo (JP); Yusaku Ito, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 346 days.

(21) Appl. No.: 14/840,742

(22) Filed: Aug. 31, 2015

(65) Prior Publication Data

US 2016/0067819 A1 Mar. 10, 2016

(30) Foreign Application Priority Data

Sep. 9, 2014 (JP) ................................ 2014-183552

(51) Int. Cl.
| | | |
|---|---|---|
| B23K 26/00 | (2014.01) | |
| B23K 26/035 | (2014.01) | |
| B23K 26/08 | (2014.01) | |
| B23K 26/352 | (2014.01) | |
| B23K 26/03 | (2006.01) | |
| B23K 26/364 | (2014.01) | |
| B23K 103/00 | (2006.01) | |

(52) U.S. Cl.
CPC .......... *B23K 26/032* (2013.01); *B23K 26/364* (2015.10); *B23K 2203/56* (2015.10)

(58) Field of Classification Search
CPC ........ B23K 26/03; B23K 26/08; B23K 26/00; B23K 26/35
USPC ............ 219/121.61, 121.62, 121.68, 121.69, 219/121.78, 121.82, 121.83; 438/463
See application file for complete search history.

(56) References Cited

U.S. PATENT DOCUMENTS

| | | | | |
|---|---|---|---|---|
| 6,522,941 | B1 * | 2/2003 | Tashiro .............. | B23K 26/0823 700/180 |
| 6,847,007 | B2 * | 1/2005 | Danzer ................ | B23K 26/123 216/65 |
| 2003/0160149 | A1 * | 8/2003 | Dwyer ................... | B23K 26/04 250/208.1 |

FOREIGN PATENT DOCUMENTS

JP 2006-289388 10/2006

* cited by examiner

*Primary Examiner* — Samuel M Heinrich
(74) *Attorney, Agent, or Firm* — Greer Burns & Crain Ltd.

(57) ABSTRACT

A laser processing apparatus includes a laser beam applying unit having a processing head for applying a laser beam to a workpiece held on a chuck table, a moving unit for relatively moving the chuck table and the laser beam applying unit, a controller for controlling the laser beam applying unit and the moving unit, an input unit for inputting a desired processing result, and a three-dimensional imaging unit for imaging a processed condition of the workpiece held on the chuck table to form a three-dimensional image. The controller adjusts processing conditions so as to obtain the desired processing result input by the input unit according to the desired processing result and the three-dimensional image formed by the three-dimensional imaging unit, and then controls the laser beam applying unit and the moving unit according to the processing conditions adjusted in the processing conditions adjusting step.

3 Claims, 13 Drawing Sheets

FIG.8

| Processing factor | Nemurical range | |
|---|---|---|
| Repetition frequency (KHz) | Max | 200 |
| | Min | 40 |
| Power (W) | Max | 2 |
| | Min | 0.5 |
| Work feed speed (mm/second) | Max | 200 |
| | Min | 50 |

FIG.9A

| Test sample No. | Repetition frequency (KHz) | Power (W) | Work feed speed (mm/second) | Groove depth (μm) |
|---|---|---|---|---|
| #1 | 200 | 2 | 200 | |
| #2 | 40 | 2 | 50 | |
| #3 | 40 | 0.5 | 200 | |
| #4 | 120 | 1.25 | 125 | |
| #5 | 200 | 0.5 | 50 | |

FIG.9B

| Test sample No. | Repetition frequency (KHz) | Power (W) | Work feed speed (mm/second) | Groove depth (μm) |
|---|---|---|---|---|
| #1 | 200 | 2 | 200 | 18.4 |
| #2 | 40 | 2 | 50 | 30.0 |
| #3 | 40 | 0.5 | 200 | 3.3 |
| #4 | 120 | 1.25 | 125 | 16.8 |
| #5 | 200 | 0.5 | 50 | 22.5 |

FIG. 13

| Processing factor | Nemurical range | |
|---|---|---|
| Repetition frequency (KHz) | Max | 200 |
| | Min | 40 |
| Power (W) | Max | 2 |
| | Min | 0.5 |
| Work feed speed (mm/second) | Max | 200 |
| | Min | 125 |

FIG.14A

| Test sample No. | Repetition frequency (KHz) | Power (W) | Work feed speed (mm/second) | Groove depth (μm) |
|---|---|---|---|---|
| #1 | 40 | 0.5 | 200 | |
| #2 | 120 | 1.25 | 162.5 | |
| #3 | 200 | 0.5 | 125 | |
| #4 | 200 | 2 | 200 | |
| #5 | 40 | 2 | 125 | |

FIG.14B

| Test sample No. | Repetition frequency (KHz) | Power (W) | Work feed speed (mm/second) | Groove depth (μm) |
|---|---|---|---|---|
| #1 | 40 | 0.5 | 200 | 3.6 |
| #2 | 120 | 1.25 | 162.5 | 13.7 |
| #3 | 200 | 0.5 | 125 | 10.4 |
| #4 | 200 | 2 | 200 | 18.5 |
| #5 | 40 | 2 | 125 | 15.1 |

# LASER PROCESSING APPARATUS

BACKGROUND OF THE INVENTION

Field of the Invention

The present invention relates to a laser processing apparatus for performing laser processing to a workpiece such as a wafer.

Description of the Related Art

In a semiconductor device fabrication process, a plurality of crossing division lines are formed on the front side of a substantially disk-shaped semiconductor wafer to thereby define a plurality of separate regions where a plurality of semiconductor devices such as ICs and LSIs are each formed. The semiconductor wafer is divided along the division lines to thereby divide the regions where the semiconductor devices are formed from each other, thus obtaining a plurality of individual semiconductor device chips.

As a method of dividing a wafer such as a semiconductor wafer along the division lines, there has been proposed a method including the steps of applying a laser beam having an absorption wavelength to the wafer along the division lines to thereby form a laser processed groove as a break start point along each division line by ablation and next applying an external force to the wafer along each division line where the laser processed groove as the break start point is formed, thereby breaking the wafer along each division line.

The laser processing mentioned above is performed by using a laser processing apparatus. The laser processing apparatus includes workpiece holding means for holding a workpiece, laser beam applying means having a processing head for applying a laser beam to the workpiece held by the workpiece holding means, feeding means for relatively moving the workpiece holding means and the laser beam applying means in a feeding direction (X direction), indexing means for relatively moving the workpiece holding means and the laser beam applying means in an indexing direction (Y direction) perpendicular to the feeding direction (X direction), and alignment means for detecting a subject area of the workpiece to be processed (see Japanese Patent Laid-open No. 2006-289388, for example).

SUMMARY OF THE INVENTION

However, in the case of forming a laser processed groove having a predetermined depth (e.g., 10 μm) on the workpiece such as a wafer, it is necessary to suitably adjust the numerical values for various processing factors including the power, repetition frequency, pulse width, and focused spot diameter of the laser beam and a work feed speed and set processing conditions by trial and error as measuring the depth of the laser processed groove. As a result, the productivity is reduced. Further, the wafer as the workpiece differs in characteristics according to kind or manufacturer, so that the processing conditions must be changed every time the wafer changes. Accordingly, the operator requires much time for setting of the processing conditions.

It is therefore an object of the present invention to provide a laser processing apparatus which can automatically set the processing conditions for the workpiece by inputting necessary items.

In accordance with an aspect of the present invention, there is provided a laser processing apparatus including workpiece holding means for holding a workpiece; laser beam applying means having a processing head for applying a laser beam to the workpiece held by the workpiece holding means; moving means for relatively moving the workpiece holding means and the laser beam applying means; alignment means for detecting a subject area of the workpiece held by the workpiece holding means; control means for controlling the laser beam applying means and the moving means; input means for inputting a desired processing result to the control means; and three-dimensional imaging means for imaging a processed condition of the workpiece held by the workpiece holding means to form a three-dimensional image, wherein the control means performs a processing conditions adjusting step of adjusting processing conditions so as to obtain the desired processing result input by the input means according to the desired processing result and the three-dimensional image formed by the three-dimensional imaging means, and then controls the laser beam applying means and the moving means according to the processing conditions adjusted in the processing conditions adjusting step.

Preferably, the processing conditions adjusting step by the control means includes a fundamental numerical value setting step of setting a fundamental numerical value of each processing factor according to the desired processing result input from the input means and a fundamental numerical range of each processing factor; a fundamental processing performing step of controlling the laser beam applying means and the moving means according to the fundamental numerical value of each processing factor set in the fundamental numerical value setting step to thereby perform fundamental processing to the workpiece held by the workpiece holding means; a three-dimensional imaging step of operating the three-dimensional imaging means to image the processed condition of the workpiece processed by the fundamental processing performing step, thereby forming a three-dimensional image; a graph making step of making a graph of the processing results in relation to each processing factor according to the three-dimensional image formed in the three-dimensional imaging step; a changed numerical range setting step of selecting the processing factor having an influence upon the processing results by comparing the graphs each corresponding to the processing factors as made in the graph making step and then setting a changed numerical range for the processing factor selected above; a changed numerical value setting step of setting a changed numerical value of each processing factor according to the changed numerical range set in the changed numerical range setting step; and a changed processing performing step of controlling the laser beam applying means and the moving means according to the changed numerical value of each processing factor set in the changed numerical value setting step, thereby performing changed processing to the workpiece held by the workpiece holding means; all of the three-dimensional imaging step, the graph making step, the changed numerical range setting step, the changed numerical value setting step, and the changed processing performing step being repeated until the actual processing result obtained by the changed processing falls within an allowable range of the desired processing result.

Preferably, the fundamental numerical value setting step, the graph making step, and the changed numerical value setting step are performed according to an experimental design.

The laser processing apparatus according to the present invention includes the three-dimensional imaging means for imaging the processed condition of the workpiece held by the workpiece holding means to form the three-dimensional image of this processed condition. The control means performs the processing conditions adjusting step of adjusting the processing conditions so as to obtain the desired processing result input by the input means according to this desired processing result and the three-dimensional image formed by the three-dimensional imaging means. Then, the control means controls the laser beam applying means and the moving means according to the processing conditions adjusted in the processing conditions adjusting step. Accordingly, the processing conditions for the workpiece can be automatically set by inputting necessary items from the input means. Accordingly, the operator does not need to set the processing conditions by trial and error, so that the productivity can be improved.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIG. 8 is a table for illustrating a fundamental numerical range of each processing factor input into the control means;

FIGS. 9A and 9B are tables for illustrating a fundamental numerical value of each processing factor set in a fundamental numerical value setting step by the control means;

FIG. 13 is a table for illustrating a changed numerical range of each processing factor set in a changed numerical range setting step by the control means; and FIGS. 14A and 14B are tables for illustrating a changed numerical value of each processing factor set in a changed numerical value setting step by the control means.

DETAILED DESCRIPTION OF THE PREFERRED EMBODIMENT

Figure 1:
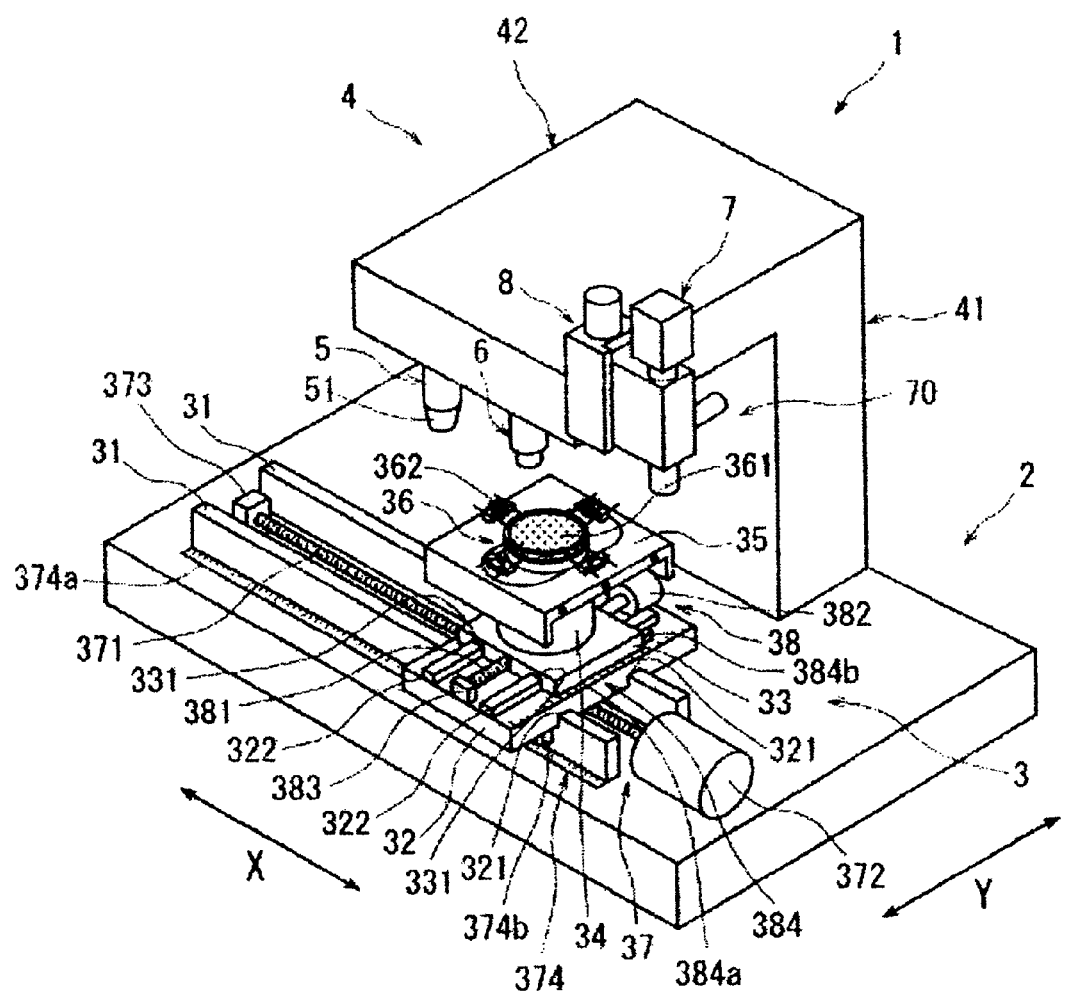
FIG. 1 is a perspective view of a laser processing apparatus according to a preferred embodiment of the present invention.

A preferred embodiment of the laser processing apparatus according to the present invention will now be described in detail with reference to the attached drawings. FIG. 1 is a perspective view of a laser processing apparatus 1 according to this preferred embodiment. The laser processing apparatus 1 shown in FIG. 1 includes a stationary base 2, a workpiece holding mechanism 3 for holding a workpiece, the workpiece holding mechanism 3 being provided on the stationary base 2 so as to be movable in a feeding direction (X direction) shown by an arrow X, and a laser beam applying unit 4 provided on the stationary base 2, the laser beam applying unit 4 having laser beam applying means to be hereinafter described.

The workpiece holding mechanism 3 includes a pair of guide rails 31 provided on the stationary base 2 so as to extend parallel to each other in the X direction, a first slide block 32 provided on the guide rails 31 so as to be movable in the X direction, a second slide block 33 provided on the first slide block 32 so as to be movable in an indexing direction (Y direction) shown by an arrow Y perpendicular to the X direction, a cover table 35 supported by a cylindrical member 34 standing on the second slide block 33, and a chuck table 36 as workpiece holding means. The chuck table 36 has a vacuum chuck 361 formed of a porous material. A workpiece such as a disk-shaped semiconductor wafer is adapted to be held under suction on the upper surface of the vacuum chuck 361 as a holding surface by operating suction means (not shown). The chuck table 36 is rotatable by a pulse motor (not shown) provided in the cylindrical member 34. The chuck table 36 is provided with clamps 362 for fixing an annular frame supporting a semiconductor wafer as the workpiece through a protective tape.

The lower surface of the first slide block 32 is formed with a pair of guided grooves 321 for slidably engaging the pair of guide rails 31 mentioned above. A pair of guide rails 322 are provided on the upper surface of the first slide block 32 so as to extend parallel to each other in the Y direction. Accordingly, the first slide block 32 is movable in the X direction along the guide rails 31 by the slidable engagement of the guided grooves 321 with the guide rails 31. The workpiece holding mechanism 3 further includes X moving means 37 for moving the first slide block 32 in the X direction along the guide rails 31. The X moving means 37 includes an externally threaded rod 371 extending parallel to the guide rails 31 so as to be interposed therebetween and a pulse motor 372 as a drive source for rotationally driving the externally threaded rod 371. The externally threaded rod 371 is rotatably supported at one end thereof to a bearing block 373 fixed to the stationary base 2 and is connected at the other end to the output shaft of the pulse motor 372 so as to receive the torque thereof. The externally threaded rod 371 is engaged with a tapped through hole formed in an internally threaded block (not shown) projecting from the lower surface of the first slide block 32 at a central portion thereof. Accordingly, the first slide block 32 is moved in the X direction along the guide rails 31 by operating the pulse motor 372 to normally or reversely rotate the externally threaded rod 371.

The laser processing apparatus 1 includes X position detecting means 374 for detecting the X position of the chuck table 36. The X position detecting means 374 includes a linear scale 374a extending along one of the guide rails 31 and a read head 374b provided on the first slide block 32 and movable along the linear scale 374a together with the first slide block 32. The read head 374b of the X position detecting means 374 transmits a pulse signal of one pulse every 1 μm in this preferred embodiment to control means which will be hereinafter described. This control means counts the number of pulses as the pulse signal input from the read head 374*b* to thereby detect the X position of the chuck table 36. In the case that the pulse motor 372 is used as the drive source for the X moving means 37 as in this preferred embodiment, the number of pulses as a drive signal output from the control means to the pulse motor 372 may be counted by the control means to thereby detect the X position of the chuck table 36. In the case that a servo motor is used as the drive source for the X moving means 37, a pulse signal output from a rotary encoder for detecting the rotational speed of the servo motor may be sent to the control means, and the number of pulses as the pulse signal input from the rotary encoder into the control means may be counted by the control means to thereby detect the X position of the chuck table 36.

The lower surface of the second slide block 33 is formed with a pair of guided grooves 331 for slidably engaging the pair of guide rails 322 provided on the upper surface of the first slide block 32 as mentioned above. Accordingly, the second slide block 33 is movable in the Y direction along the guide rails 322 by the slidable engagement of the guided grooves 331 with the guide rails 322. The workpiece holding mechanism 3 further includes Y moving means 38 for moving the second slide block 33 in the Y direction along the guide rails 322. The Y moving means 38 includes an externally threaded rod 381 extending parallel to the guide rails 322 so as to be interposed therebetween and a pulse motor 382 as a drive source for rotationally driving the externally threaded rod 381. The externally threaded rod 381 is rotatably supported at one end thereof to a bearing block 383 fixed to the upper surface of the first slide block 32 and is connected at the other end to the output shaft of the pulse motor 382 so as to receive the torque thereof. The externally threaded rod 381 is engaged with a tapped through hole formed in an internally threaded block (not shown) projecting from the lower surface of the second slide block 33 at a central portion thereof. Accordingly, the second slide block 33 is moved in the Y direction along the guide rails 322 by operating the pulse motor 382 to normally or reversely rotate the externally threaded rod 381.

The laser processing apparatus 1 includes Y position detecting means 384 for detecting the Y position of the chuck table 36. The Y position detecting means 384 includes a linear scale 384*a* extending along one of the guide rails 322 and a read head 384*b* provided on the second slide block 33 and movable along the linear scale 384*a* together with the second slide block 33. The read head 384*b* of the Y position detecting means 384 transmits a pulse signal of one pulse every 1 μm in this preferred embodiment to the control means to be described later. This control means counts the number of pulses as the pulse signal input from the read head 384*b* to thereby detect the Y position of the chuck table 36. In the case that the pulse motor 382 is used as the drive source for the Y moving means 38 as in this preferred embodiment, the number of pulses as a drive source output from the control means to the pulse motor 382 may be counted by the control means to thereby detect the Y position of the chuck table 36. In the case that a servo motor is used as the drive source for the Y moving means 38, a pulse signal output from a rotary encoder for detecting the rotational speed of the servo motor may be sent to the control means, and the number of pulses as the pulse signal input from the rotary encoder into the control means may be counted by the control means to thereby detect the Y position of the chuck table 36.

The laser beam applying unit 4 includes a support member 41 provided on the stationary base 2, a unit casing 42 supported by the support member 41 so as to extend in a substantially horizontal direction, laser beam applying means 5 provided on the unit casing 42, and imaging means 6 for detecting a subject area to be laser-processed. The laser beam applying means 5 includes pulsed laser beam oscillating means (not shown) provided in the unit casing 42 and a processing head 51 for focusing a pulsed laser beam oscillated by the pulsed laser beam oscillating means and applying this pulsed laser beam to the workpiece held on the chuck table 36. The pulsed laser beam oscillating means includes a pulsed laser oscillator and repetition frequency setting means.

The imaging means 6 is provided on the unit casing 42 at a position lying on an extension line from the processing head 51 in the X direction so as to be spaced a predetermined distance. The imaging means 6 includes an ordinary imaging device (CCD) for imaging the workpiece by using visible light, infrared light applying means for applying infrared light to the workpiece, an optical system for capturing the infrared light applied to the workpiece by the infrared light applying means, and an imaging device (infrared CCD) for outputting an electrical signal corresponding to the infrared light captured by the optical system. An image signal output from the imaging means 6 is transmitted to the control means to be described later.

The laser processing apparatus 1 further includes three-dimensional imaging means 7 for imaging a processed condition of the workpiece held on the chuck table 36 to form a three-dimensional image. The three-dimensional imaging means 7 includes an interference type imaging mechanism 70 provided on the unit casing 42 for imaging the workpiece held on the chuck table 36 in three dimensions composed of the X direction, the Y direction perpendicular to the X direction, and the Z direction perpendicular to both the X direction and the Y direction and then outputting an image signal obtained above. The interference type imaging mechanism 70 is supported to first Z moving means 8 provided on the unit casing 42 so as to be movable in the Z direction by the first Z moving means 8. The interference type imaging mechanism 70 and the first Z moving means 8 constituting the three-dimensional imaging means 7 will now be described in detail with reference to FIGS. 2 to 4.

Figure 2:
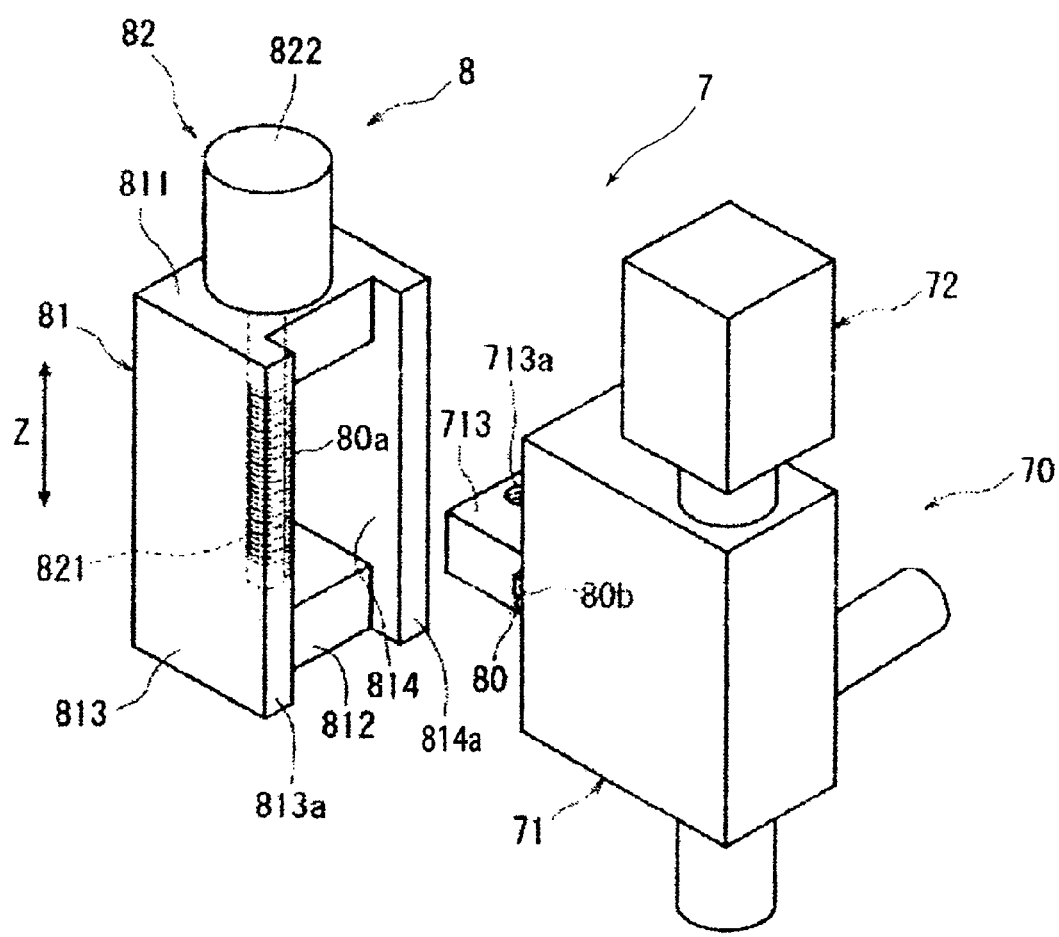
FIG. 2 is an exploded perspective view of three-dimensional imaging means included in the laser processing apparatus shown in FIG. 1.
Figure 3:
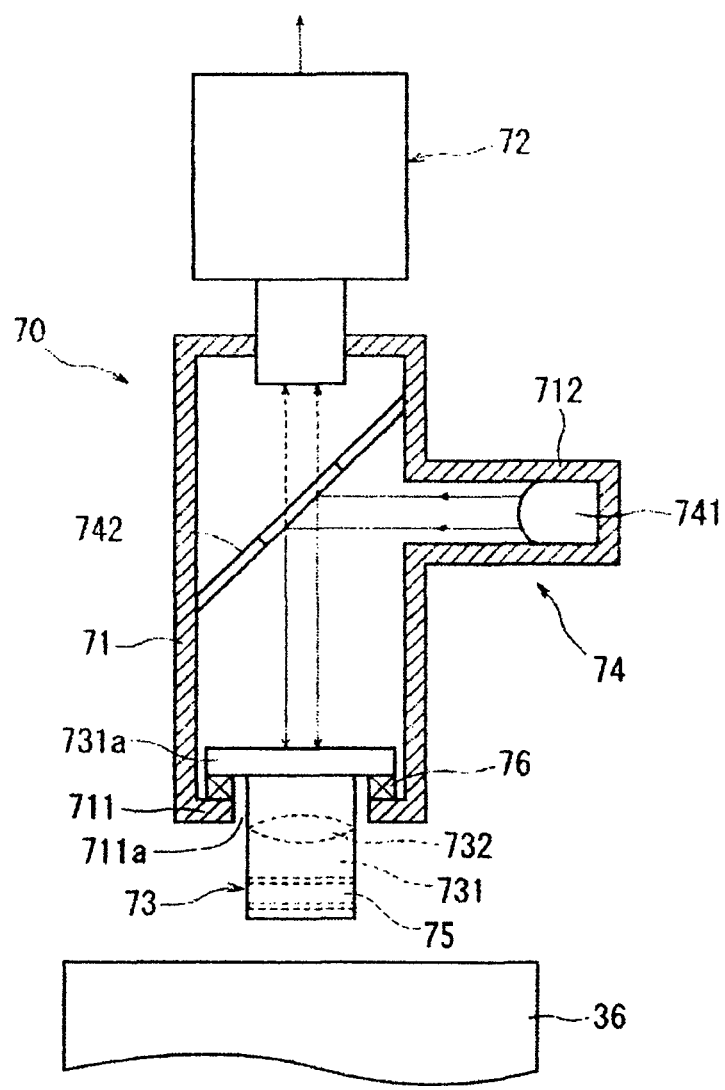
FIG. 3 is a sectional view showing an essential part of an interference type imaging mechanism constituting the three-dimensional imaging means shown in FIG. 2.
Figure 4:
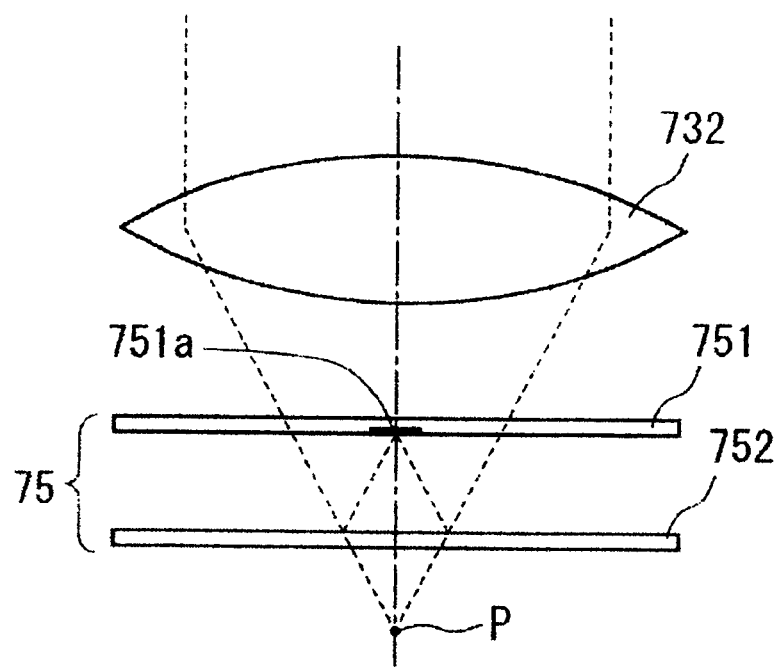
FIG. 4 is a schematic view for illustrating focusing means and interference light generating means included in the interference type imaging mechanism shown in FIG. 3.

The interference type imaging mechanism 70 shown in FIGS. 2 to 4 is a so-called Mirau interference type imaging mechanism. As shown in FIG. 3 in detail, the interference type imaging mechanism 70 includes a mechanism housing 71, imaging device means 72 provided at the upper portion of the mechanism housing 71, focusing means 73 provided at the lower portion of the mechanism housing 71 so as to be opposed to the holding surface (upper surface) of the chuck table 36, and light applying means 74 for applying light through the focusing means 73 to the workpiece held on the holding surface of the chuck table 36. The imaging device means 72 includes a plurality of pixels arranged in the X direction and the Y direction and outputs an image signal to the control means to be described later.

The focusing means 73 constituting the interference type imaging mechanism 70 is composed of a unit case 731 and an objective lens 732 provided in the unit case 731. As shown in FIG. 4, the objective lens 732 functions to focus the light from the light applying means 74 to a focal point P (imaging position). In this preferred embodiment, the focused spot diameter at the focal point P is set to 100 μm. Further, interference light generating means 75 is provided in the unit case 731 of the focusing means 73. The interference light generating means 75 functions to generate interference light according to return light reflected on the workpiece held on the holding surface of the chuck table 36.

As shown in FIG. 4, the interference light generating means 75 is composed of a glass plate 751 interposed between the objective lens 732 and the chuck table 36 and a first beam splitter 752 interposed between the glass plate 751 and the chuck table 36. The glass plate 751 is provided with a central microscopic mirror 751a having a diameter of 0.5 mm, for example. The first beam splitter 752 functions to partially transmit the light applied from the light applying means 74 and focused by the objective lens 732, thereby applying the transmitted light to the workpiece held on the holding surface of the chuck table 36 and also to partially reflect the light applied from the light applying means 74 and focused by the objective lens 732, thereby directing the reflected light toward the mirror 751a of the glass plate 751. The transmitted light through the first beam splitter 752 is reflected at the focal point P (imaging position) to interfere with the reflected light from the first beam splitter 752 on the glass plate 751. Thus, the focusing means 73 and the interference light generating means 75 cooperate to generate interference light having a high intensity and guide this interference light toward the imaging device means 72.

As shown in FIG. 3, the mechanism housing 71 has a bottom wall 711 formed with a mount hole 711a. The unit case 731 containing the objective lens 732 and the interference light generating means 75 is mounted to the mechanism housing 71 so as to be movable through the mount hole 711a of the bottom wall 711 in a direction (vertical direction as viewed in FIG. 3) perpendicular to the holding surface (upper surface) of the chuck table 36. A flange portion 731a is provided at the upper end of the unit case 731, and an actuator 76 is provided between the bottom wall 711 of the mechanism housing 71 and the flange portion 731a of the unit case 731 of the focusing means 73. The actuator 76 functions as second Z moving means for moving the unit case 731 in the vertical direction as viewed in FIG. 3. In this preferred embodiment, the actuator 76 is provided by a piezoelectric motor including a piezoelectric element adapted to axially extend according to a voltage applied. Accordingly, the actuator 76 provided by such a piezoelectric motor can move the unit case 731 in the vertical direction as viewed in FIG. 3 (in the direction perpendicular to the holding surface of the chuck table 36) according to a voltage applied under the control by the control means to be described later. As a modification, a high-responsive voice coil motor such as a piezoelectric motor may be used for the actuator 76.

The light applying means 74 is composed of a light source 741 such as an LED provided in a side projection 712 projecting from one side surface of the mechanism housing 71 and a second beam splitter 742 provided in the mechanism housing 71 at a position between the imaging device means 72 and the focusing means 73. The second beam splitter 742 functions to guide the light emitted from the light source 741 toward the focusing means 73 and also to guide the light reflected from the workpiece held on the holding surface of the chuck table 36 toward the imaging device means 72.

The configuration of the first Z moving means 8 will now be described in detail with reference to FIG. 2. The first Z moving means 8 is composed of a support case 81 for supporting the mechanism housing 71 of the interference type imaging mechanism 70 so that the mechanism housing 71 is movable in the Z direction shown by an arrow Z (in the direction perpendicular to the holding surface of the chuck table 36) and operating means 82 for moving the mechanism housing 71 supported to the support case 81 in the Z direction. The support case 81 is composed of an upper wall 811, a bottom wall 812, opposite side walls 813 and 814, and a rear wall (not shown). The opposite side walls 813 and 814 project to the front side to respectively form a pair of guide rails 813a and 814a. The operating means 82 includes an externally threaded rod 821 extending parallel to the opposite side walls 813 and 814 of the support case 81 so as to be interposed therebetween. The externally threaded rod 821 is rotatably supported to the upper wall 811 and the bottom wall 812. The operating means 82 further includes a pulse motor 822 as a drive source provided on the upper wall 811 for rotationally driving the externally threaded rod 821. An internally threaded block 713 having a tapped through hole 713a is provided on the rear wall of the mechanism housing 71. The tapped through hole 713a of the internally threaded block 713 is threadedly engaged with the externally threaded rod 821 of the operating means 82. Accordingly, the mechanism housing 71 having the internally threaded block 713 is moved along the guide rails 813a and 814a in the Z direction by operating the pulse motor 822 to normally or reversely rotate the externally threaded rod 821.

The three-dimensional imaging means 7 further includes Z position detecting means 80 for detecting the Z position of the interference type imaging mechanism 70 to be moved by the first Z moving means 8. The Z position detecting means 80 is composed of a linear scale 80a provided on the guide rail 813a and a read head 80b mounted on the mechanism housing 71 of the interference type imaging mechanism 70 and movable along the linear scale 80a together with the mechanism housing 71. The read head 80b of the Z position detecting means 80 transmits a pulse signal of one pulse every 1 μm, for example, to the control means to be described later.

Figure 5:
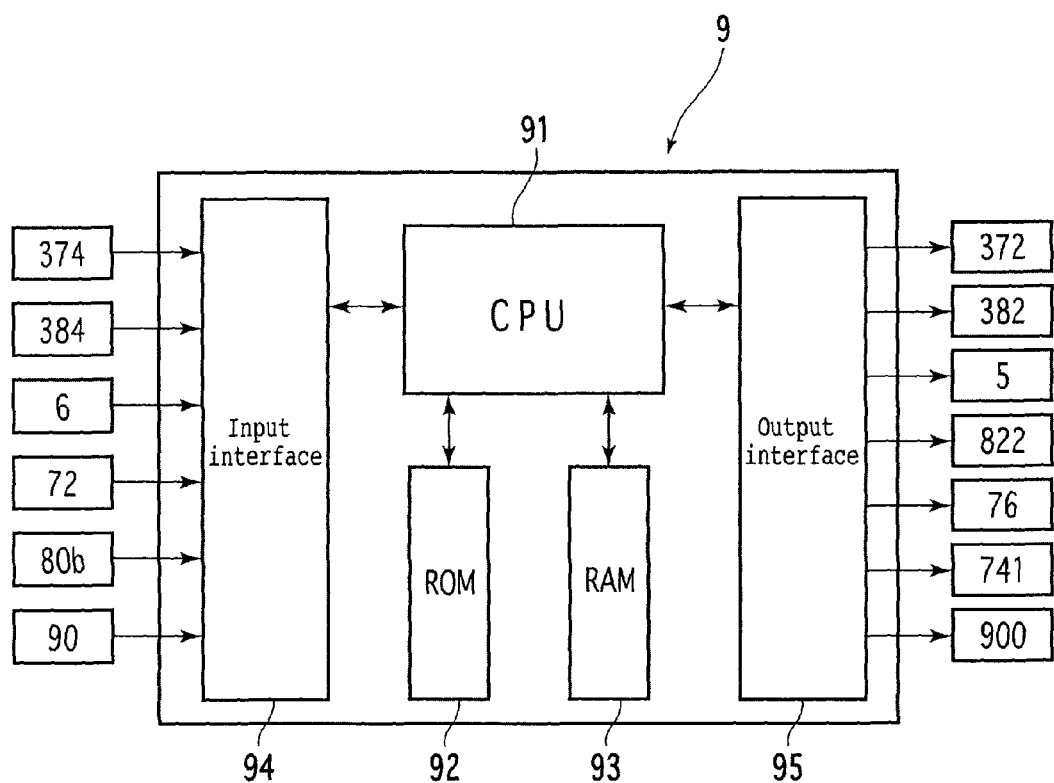
FIG. 5 is a block diagram of control means included in the laser processing apparatus shown in FIG. 1.

The laser processing apparatus 1 further includes control means 9 shown in FIG. 5. The control means 9 functions to generate image information according to an image signal output from the imaging device means 72 of the interference type imaging mechanism 70. The control means 9 controls not only the components of the three-dimensional imaging means 7, but also all the other components of the laser processing apparatus 1. The control means 9 is configured by a computer, and it includes a central processing unit (CPU) 91 for performing operational processing according to a control program, a read only memory (ROM) 92 preliminarily storing the control program, a random access memory (RAM) 93 for storing the results of computation, etc., an input interface 94, and an output interface 95. Detection signals from the X position detecting means 374, the Y position detecting means 384, the imaging means 6, the imaging device means 72 of the interference type imaging mechanism 70, the read head 80b of the Z position detecting means 80 for detecting the Z position of the interference type imaging mechanism 70, and input means 90 are input into the input interface 94 of the control means 9. On the other hand, control signals are output from the output interface 95 of the control means 9 to the pulse motor 372 of the X moving means 37, the pulse motor 382 of the Y moving means 38, the laser beam applying means 5, the pulse motor 822 of the first Z moving means 8, the actuator 76 provided by a piezoelectric motor functioning as the second Z moving means, the light source 741 of the light applying means 74, and output means 900 such as display means and a printer. The RAM 93 includes a memory area preliminarily storing a control map shown in FIG. 6 for setting the relation between a voltage applied to the actuator 76 provided by a piezoelectric motor and an axial displacement of the piezoelectric motor. The RAM 93 also includes other memory areas.

Figure 7:
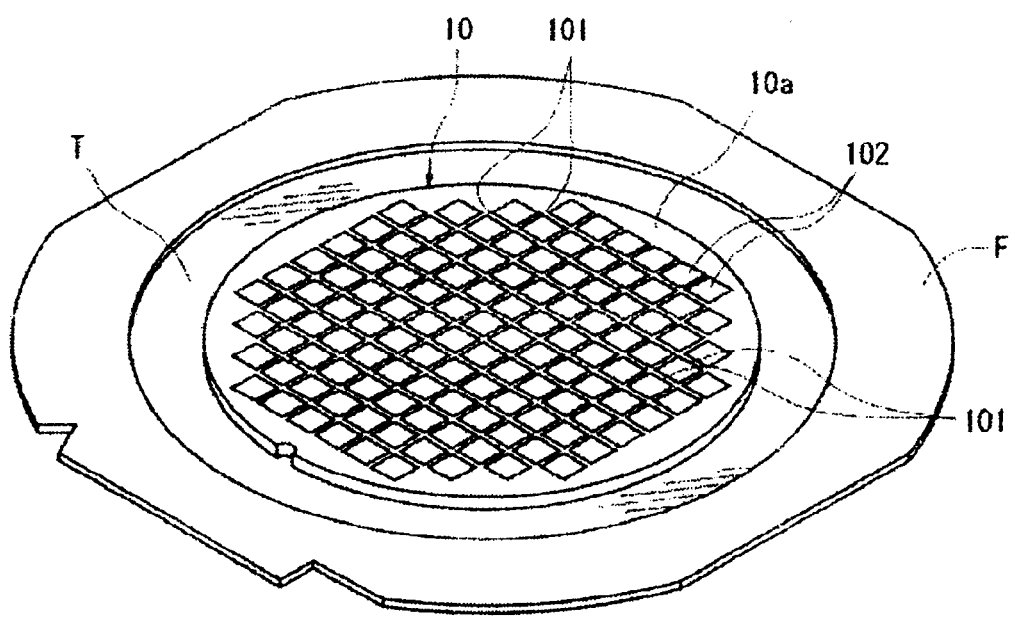
FIG. 7 is a perspective view of a semiconductor wafer as a workpiece in the condition where the semiconductor wafer is attached to a dicing tape supported to an annular frame.

The operation of the laser processing apparatus 1 configured above will now be described. FIG. 7 is a perspective view of a semiconductor wafer 10 as a workpiece to be processed by the laser processing apparatus 1 in the condition where the semiconductor wafer 10 is attached to a dicing tape T supported to an annular frame F. The semiconductor wafer 10 shown in FIG. 7 is a silicon wafer. A plurality of crossing division lines 101 are formed on the front side 10a of the semiconductor wafer 10 to define a plurality of separate regions where a plurality of devices 102 such as ICs and LSIs are respectively formed.

There will now be described a setting procedure for processing conditions in forming a laser processed groove having a predetermined depth (e.g., 10 μm) on the semiconductor wafer 10. First, the semiconductor wafer 10 supported through the dicing tape T to the annular frame F is placed on the chuck table 36 of the laser processing apparatus 1 shown in FIG. 1 in the condition where the dicing tape T is in contact with the upper surface of the chuck table 36. Thereafter, the suction means (not shown) is operated to hold the semiconductor wafer 10 through the dicing tape T on the chuck table 36 under suction. Accordingly, the semiconductor wafer 10 is held through the dicing tape T on the chuck table 36 in the condition where the front side 10a of the semiconductor wafer 10 is oriented upward. Further, the annular frame F supporting the dicing tape T is fixed by the clamps 362 provided on the chuck table 36. Thereafter, the X moving means 37 is operated to move the chuck table 36 holding the semiconductor wafer 10 to a position directly below the imaging means 6.

In the condition where the chuck table 36 is positioned directly below the imaging means 6, an alignment operation is performed by the imaging means 6 and the control means 9 to detect a subject area of the semiconductor wafer 10 to be laser-processed. More specifically, the imaging means 6 and the control means 9 perform image processing such as pattern matching for making the alignment of the division lines 101 extending in a first direction on the semiconductor wafer 10 and the processing head 51 of the laser beam applying means 5, thus performing the alignment for the division lines 101 extending in the first direction. Similarly, this alignment is performed for the other division lines 101 extending in a second direction perpendicular to the first direction on the semiconductor wafer 10.

After performing the alignment operation to detect the subject area of the semiconductor wafer 10 held on the chuck table 36, a processing conditions adjusting step is performed by the control means 9 in such a manner that the processing conditions are adjusted so as to obtain a desired processing result input by the input means 90 according to the desired processing result and a three-dimensional image formed by the three-dimensional imaging means 7. In this processing conditions adjusting step, the operator first sets the target depth of the laser processed groove (e.g., 10 μm) as the desired processing result and also sets the fundamental numerical ranges of processing factors shown in FIG. 8. The target depth and the fundamental numerical ranges set above are input from the input means 90 to the control means 9 by the operator. For example, the processing factors are defined as the repetition frequency of a pulsed laser beam, the power of the pulsed laser beam, and the work feed speed. The fundamental numerical range of each processing factor is set by setting the maximum value and the minimum value of each processing factor. For example, as shown in FIG. 8, the maximum value and the minimum value of the repetition frequency of the pulsed laser beam are set to 200 kHz and 40 kHz, respectively, the maximum value and the minimum value of the power of the pulsed laser beam are set to 2 W and 0.5 W, respectively, and the maximum value and the minimum value of the work feed speed are set to 200 mm/second and 50 mm/second, respectively.

After inputting the fundamental numerical range of each processing factor, the control means 9 performs a fundamental numerical value setting step of computing according to the fundamental numerical range of each processing factor by using an experimental design to thereby set a fundamental value of each processing factor. By performing this fundamental numerical value setting step, the fundamental numerical value of each processing factor is set as shown in FIG. 9A. For example, five test samples #1 to #5 are prepared as shown in FIG. 9A, wherein the fundamental numerical values for the repetition frequency, power, and work feed speed as the processing factors are set in each test sample and the processing result (the depth of the laser processed groove) is also set. The fundamental numerical values set above are stored into the RAM 93.

Figure 10:
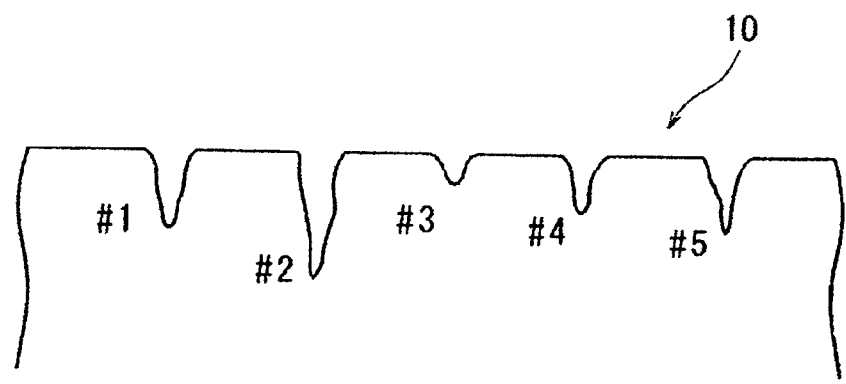
FIG. 10 is a sectional view of laser processed grooves #1 to #5 formed in a fundamental processing performing step by the control means.

After performing the fundamental numerical value setting step mentioned above, the control means 9 performs a fundamental processing performing step of controlling the laser beam applying means 5 and the X moving means 37 according to the fundamental numerical values set in the fundamental numerical value setting step to thereby perform fundamental processing to the semiconductor wafer 10 held on the chuck table 36. More specifically, the control means 9 moves the chuck table 36 to position one end of a predetermined one of the division lines 101 directly below the processing head 51 of the laser beam applying means 5. Thereafter, the control means 9 operates the laser beam applying means 5 and the X moving means 37 by using the fundamental numerical values set in the test sample #1 (repetition frequency: 200 kHz, power: 2 W, work feed speed: 200 mm/second) to thereby apply a pulsed laser beam along the predetermined division line 101. The focused spot diameter of the pulsed laser beam to be focused by the processing head 51 is preliminarily set to 2 μm, for example. As a result, a laser processed groove denoted by #1 in FIG. 10 is formed on the semiconductor wafer 10.

Thereafter, the control means 9 operates the Y moving means 38 to move the chuck table 36 in the Y direction by the pitch of the division lines 101, thereby positioning one end of the next division line 101 directly below the processing head 51. Thereafter, the control means 9 similarly operates the laser beam applying means 5 and the X moving means 37 by using the fundamental numerical values set in the test sample #2 (repetition frequency: 40 kHz, power: 2 W, work feed speed: 50 mm/second) to thereby apply a pulsed laser beam along this next division line 101. As a result, a laser processed groove denoted by #2 in FIG. 10 is formed on the semiconductor wafer 10. Thereafter, laser processing is similarly performed along the further next division lines 101 by using the fundamental numerical values set in the test samples #3, #4, and #5. As a result, laser processed grooves denoted by #3, #4, and #5 in FIG. 10 are formed on the semiconductor wafer 10.

Figure 6:
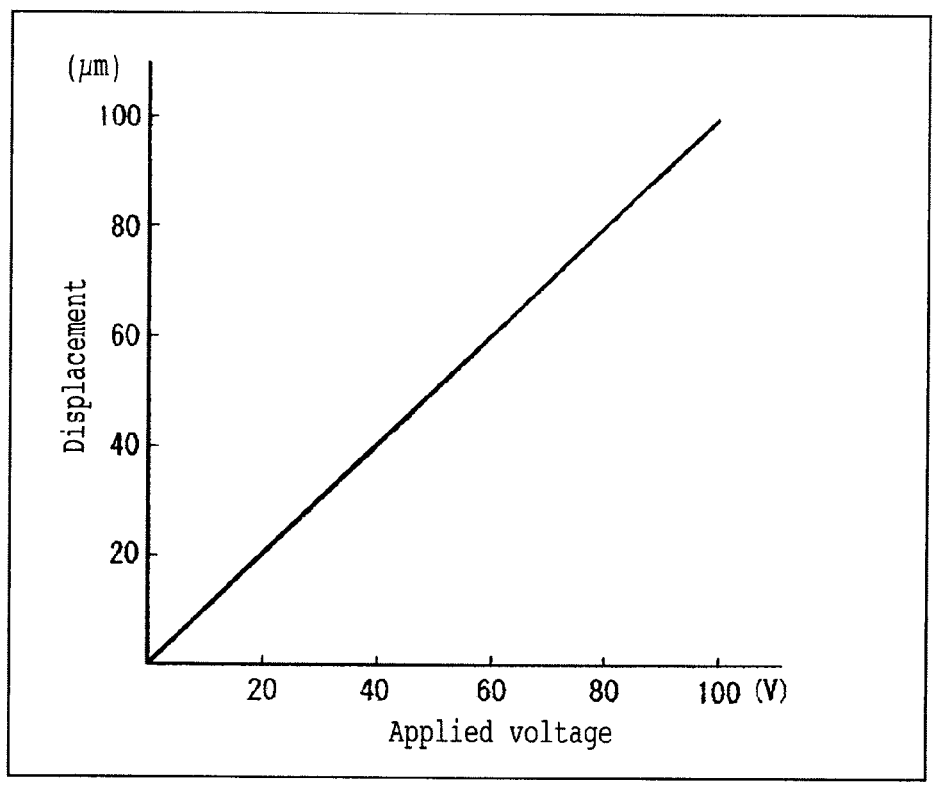
FIG. 6 is a control map setting the relation between a voltage applied to an actuator provided by a piezoelectric motor and an axial displacement of the piezoelectric motor.

After performing the fundamental processing performing step, the control means 9 performs a three-dimensional imaging step of imaging the processed condition of the semiconductor wafer 10 to form a three-dimensional image. In this three-dimensional imaging step, the control means 9 operates the X moving means 37 to move the chuck table 36 holding the semiconductor wafer 10 processed by the fundamental processing performing step to a position directly below the focusing means 73 constituting the interference type imaging mechanism 70 of the three-dimensional imaging means 7. In this condition, the laser processed groove #1 formed on the semiconductor wafer 10 is positioned directly below the focusing means 73. Thereafter, the first Z moving means 8 is operated to lower the interference type imaging mechanism 70 from a predetermined standby position. Further, a voltage of 60 V, for example, is applied to the actuator 76 provided by a piezoelectric motor as the second Z moving means, thereby axially extending the actuator 76 by an amount of 60 µm as shown in FIG. 6. In this extended condition, the focal point P (see FIG. 4) of light to be applied from the focusing means 73 of the interference type imaging mechanism 70 is set near the front side 10a (upper surface) of the semiconductor wafer 10 held on the chuck table 36.

Figure 11:
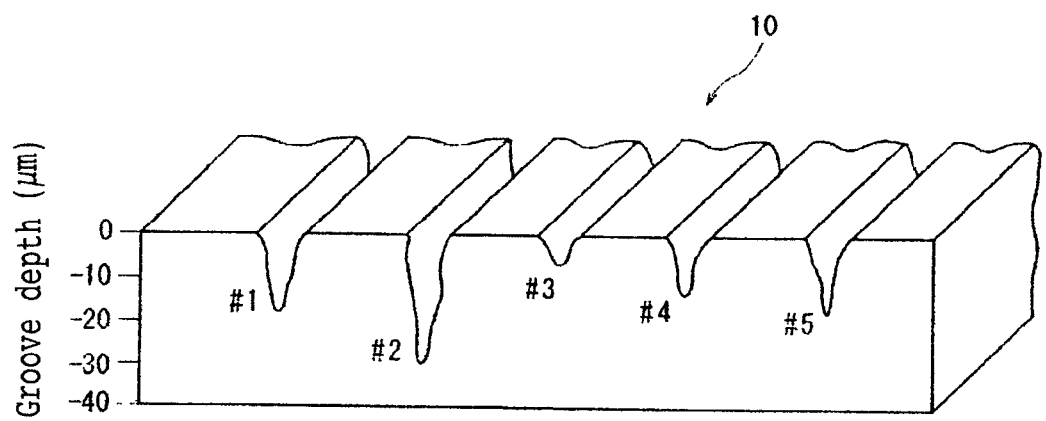
FIG. 11 is a perspective view for illustrating three-dimensional images of the laser processed grooves #1 to #5 formed in a three-dimensional imaging step by the control means.

Thereafter, the control means 9 operates the imaging device means 72 and the light source 741 of the light applying means 74 constituting the interference type imaging mechanism 70. Further, the voltage applied to the actuator 76 as a piezoelectric motor is reduced from 60 V in steps of 1 V. As a result, the actuator 76 as a piezoelectric motor is reduced in length in steps of 1 µm as apparent from FIG. 6, so that the focusing means 73 is lowered in the Z direction in steps of 1 µm. Every time the focusing means 73 is lowered in steps of 1 µm, the X moving means 37 is operated by the control means 9 and the imaging device means 72 forms an image and transmits an image signal to the control means 9. The control means 9 inputs the image signal transmitted from the imaging device means 72 in steps of 100 µm for the movement of the chuck table 36 in the X direction according to the detection signal from the X position detecting means 374, thereby forming a three-dimensional image of the laser processed groove #1 as shown in FIG. 11. This three-dimensional imaging step is similarly performed to the other laser processed grooves #2 to #5 to thereby form three-dimensional images of the laser processed grooves #2 to #5 as shown in FIG. 11. At the same time, the depths of the laser processed grooves #1 to #5 are measured from the three-dimensional images of the laser processed grooves #1 to #5. Thereafter, the control means 9 stores the three-dimensional images of the laser processed grooves #1 to #5 formed above into the RAM 93 and also records the depths of the laser processed grooves #1 to #5 measured above into the column of the groove depth (µm) shown in FIG. 9A, which is previously stored with the fundamental numerical values of the processing factors in the RAM 93. The depths (µm) of the laser processed grooves #1 to #5 as recorded above are shown in FIG. 9B.

If any one of the depths (µm) of the laser processed grooves #1 to #5 recorded above falls within an allowable range (9.5 µm to 10.5 µm) of the desired processing result (10 µm as the target depth of the laser processed groove), the control means 9 decides the processing conditions for formation of this laser processed groove having the depth falling within the allowable range as desired processing conditions.

Figure 12A:
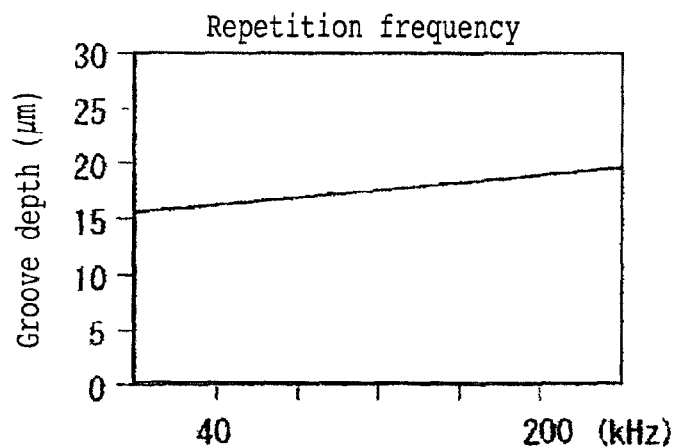
FIGS. 12A to 12C are graphs showing the relation between processing factors and processing results made in a graph making step by the control means.
Figure 12B:
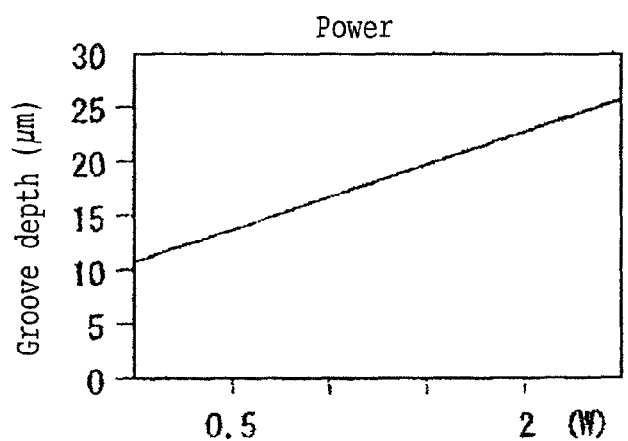
Figure 12C:
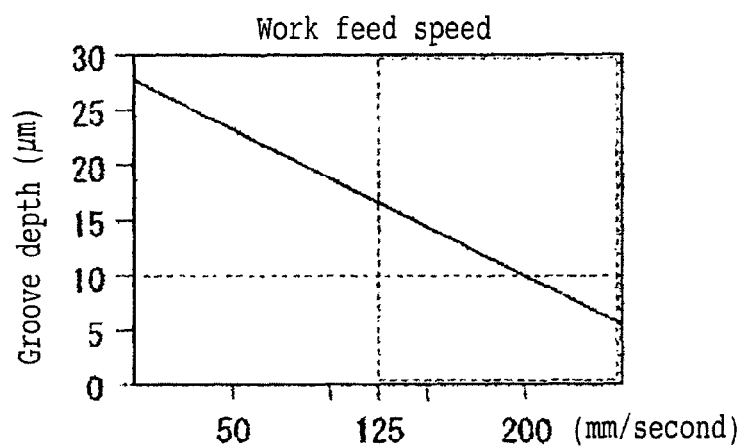

Thereafter, the control means 9 performs a graph making step of making a graph of the processing results in relation to each processing factor according to the three-dimensional images formed in the three-dimensional imaging step. More specifically, the control means 9 computes according to the three-dimensional images shown in FIG. 11 by using an experimental design and then graphs the processing tendency for the depth of the laser processed groove in relation to the repetition frequency of the pulsed laser beam, the power of the pulsed laser beam, and the work feed speed as shown in FIGS. 12A to 12C. Then, the control means 9 selects the processing factor having an influence upon the processing results by comparing the graphs shown in FIGS. 12A to 12C. That is, as apparent from the graphs shown in FIGS. 12A to 12C, it can be determined that the processing factor having a greatest influence upon the desired processing result (10 µm as the target depth of the laser processed groove) is the work feed speed having a processing tendency related to the target depth of 10 µm (changed numerical range setting step). After determining that the processing factor having an influence upon the desired processing result is the work feed speed, the control means 9 determines that the range of the work feed speed exerting an influence upon the desired processing result in the graph shown in FIG. 12C is higher than 125 mm/second which is a middle point between 50 mm/second and 200 mm/second. Then, the control means 9 changes the minimum value of the work feed speed as the processing factor from 50 mm/second (see FIG. 8) to 125 mm/second (see FIG. 13) and sets this changed numerical range (changed numerical range setting step).

After performing the changed numerical range setting step mentioned above, the control means 9 performs a changed numerical value setting step of computing according to the changed numerical range of the selected processing factor by using an experimental design and changing the numerical value of each processing factor to set this changed numerical value. By performing this changed numerical value setting step, the changed numerical values for each processing factor in all the test samples #1 to #5 are set as shown in FIG. 14A. The changed numerical values set above are stored into the RAM 93.

After performing the changed numerical value setting step mentioned above, the control means 9 performs a changed processing performing step of controlling the laser beam applying means 5 and the X moving means 37 according to the changed numerical value of each processing factor set in the changed numerical value setting step, thereby performing changed processing to the semiconductor wafer 10 held on the chuck table 36. This changed processing performing step is performed in a manner similar to that of the fundamental processing performing step mentioned above.

After performing the changed processing performing step mentioned above, the control means 9 performs a second three-dimensional imaging step of imaging the processed condition of the semiconductor wafer 10 processed by the changed processing performing step and then forming a three-dimensional image. This second three-dimensional imaging step is performed in a manner similar to that of the three-dimensional imaging step of imaging the processed condition of the semiconductor wafer 10 processed by the fundamental processing performing step mentioned above by using the three-dimensional imaging means 7. In this manner, the control means 9 creates three-dimensional images of the laser processed grooves #1 to #5 and measures the depths of the laser processed grooves #1 to #5. Further, the control means 9 stores the three-dimensional images of the laser processed grooves #1 to #5 into the RAM 93 and also records the depths of the laser processed grooves #1 to #5 measured above into the column of the groove depth (µm) shown in FIG. 14A, which is previously stored with the changed numerical values of the processing factors in the RAM 93. The depths (µm) of the laser processed grooves #1 to #5 as recorded above are shown in FIG. 14B. If any one of the depths (µm) of the laser processed grooves #1 to #5 recorded above falls within the allowable range (9.5 µm to 10.5 µm) of the desired processing result (10 µm as the target depth of the laser processed groove), the control means 9 decides the processing conditions for formation of this laser processed groove having the depth falling within the allowable range as desired processing conditions. In the case shown in FIG. 14B, the control means 9 decides the processing conditions for formation of the laser processed groove #3 having a depth of 10.4 µm falling within the allowable range as the desired processing conditions for formation of the laser processed groove having the target depth of 10 µm (repetition frequency: 200 kHz, power: 0.5 W, work feed speed: 125 mm/second). Thereafter, the control means 9 outputs the decided processing conditions (repetition frequency: 200 kHz, power: 0.5 W, work feed speed: 125 mm/second) to the output means 900, thereby displaying them on display means such as a monitor or printing them out through a printer.

In the case that the depth of each laser processed groove does not fall within the allowable range (9.5 µm to 10.5 µm) of the desired processing result (10 µm as the target depth of the laser processed groove) in the second three-dimensional imaging step, all of the graph making step, the changed numerical range setting step, the changed numerical value setting step, the changed processing performing step, and the second three-dimensional imaging step are repeated until the actual processing result obtained by the changed processing falls within the allowable range.

In the laser processing apparatus according to the present invention described above, the processing conditions for the workpiece can be automatically set by inputting necessary items. Accordingly, the operator does not need to set the processing conditions by trial and error, so that the productivity can be improved.

While the repetition frequency of the pulsed laser beam, the power of the pulsed laser beam, and the work feed speed are set as the processing conditions in the above preferred embodiment, it is preferable to set the pulse width of the pulsed laser beam and the focused spot diameter of the pulsed laser beam as the processing conditions.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus comprising:
a chuck table for holding a workpiece;
a laser beam applying unit having a processing head for applying a laser beam to said workpiece held by said chuck table;
moving mechanism for relatively moving said chuck table and said laser beam applying unit;
an alignment unit for detecting a subject area of said workpiece held by said chuck table;
a controller for controlling said laser beam applying unit and said moving mechanism;
an operation panel for inputting a desired processing result to said controller; and
three-dimensional imaging unit for imaging a processed condition of said workpiece held by said chuck table to form a three-dimensional image,
wherein said controller performs a processing conditions adjusting step of adjusting processing conditions so as to obtain said desired processing result input by said operational panel according to said desired processing result and said three-dimensional image formed by said three-dimensional imaging unit, and then controls said laser beam applying unit and said moving mechanism according to said processing conditions adjusted in said processing conditions adjusting step.

2. The laser processing apparatus according to claim 1, wherein said processing conditions adjusting step by the control means includes:
a fundamental numerical value setting step of setting a fundamental numerical value of each processing factor according to said desired processing result input from said operation panel and a fundamental numerical range of each processing factor;
a fundamental processing performing step of controlling said laser beam applying unit and said moving mechanism according to the fundamental numerical value of each processing factor set in said fundamental numerical value setting step to thereby perform fundamental processing to said workpiece held by said chuck table;
a three-dimensional imaging step of operating said three-dimensional imaging unit to image the processed condition of said workpiece processed by said fundamental processing performing step, thereby forming a three-dimensional image;
a graph making step of making a graph of the processing results in relation to each processing factor according to said three-dimensional image formed in said three-dimensional imaging step;
a changed numerical range setting step of selecting the processing factor having an influence upon the processing results by comparing the graphs each corresponding to the processing factors as made in said graph making step and then setting a changed numerical range for the processing factor selected above;
a changed numerical value setting step of setting a changed numerical value of each processing factor according to the changed numerical range set in said changed numerical range setting step; and
a changed processing performing step of controlling said laser beam applying unit and said moving mechanism according to the changed numerical value of each processing factor set in said changed numerical value setting step, thereby performing changed processing to said workpiece held by said chuck table;
all of said three-dimensional imaging step, said graph making step, said changed numerical range setting step, said changed numerical value setting step, and said changed processing performing step being repeated until the actual processing result obtained by said changed processing falls within an allowable range of said desired processing result.

3. The laser processing apparatus according to claim 2, wherein said fundamental numerical value setting step, said graph making step, and said changed numerical value setting step are performed according to an experimental design.

* * * * *